(12) United States Patent
Cacioppo (10) Patent No.: US 10,902,417 B2
(45) Date of Patent: Jan. 26, 2021

(54) SYSTEMS AND METHODS OF PROCESSING PAYMENT TRANSACTIONS USING ONE-TIME TOKENS

(71) Applicant: MASTERCARD INTERNATIONAL INCORPORATED, Purchase, NY (US)

(72) Inventor: John Cacioppo, Foristell, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1108 days.

(21) Appl. No.: 14/264,146

(22) Filed: Apr. 29, 2014

(65) Prior Publication Data
US 2015/0310425 A1 Oct. 29, 2015

(51) Int. Cl.
*G06Q 20/38* (2012.01)

(52) U.S. Cl.
CPC ......... *G06Q 20/382* (2013.01); *G06Q 20/385* (2013.01)

(58) Field of Classification Search
None
See application file for complete search history.

(56) References Cited

U.S. PATENT DOCUMENTS

| 8,478,799 | B2 * | 7/2013 | Beaverson | G06F 16/137 707/823 |
| 8,832,807 | B1 * | 9/2014 | Kuo | H04L 9/3228 726/6 |
| 2002/0007320 | A1 * | 1/2002 | Hogan | G06Q 20/00 705/26.1 |
| 2002/0116341 | A1 * | 8/2002 | Hogan | G06Q 20/04 705/64 |
| 2003/0101134 | A1 * | 5/2003 | Liu | G06Q 20/04 705/39 |
| 2003/0130955 | A1 * | 7/2003 | Hawthorne | G06Q 20/04 705/65 |
| 2004/0165728 | A1 * | 8/2004 | Crane | G06F 21/62 380/279 |

(Continued)

OTHER PUBLICATIONS

Computer Desktop Encyclopedia, http://lookup.computerlanguage.com/host_app.search?cid=C999999&term=salt&lookup=Go, Retrieved Jan. 23, 2018.*

(Continued)

*Primary Examiner* — Mohammad A. Nilforoush
*Assistant Examiner* — Gabriel Mercado
(74) *Attorney, Agent, or Firm* — Harness, Dickey & Pierce, P.L.C.

(57) ABSTRACT

Disclosed are exemplary embodiments of systems and methods for processing payment transaction using pseudo-PAN. In an exemplary embodiment, a method generally includes generating an encryption salt, receiving a request from a consumer indicating a possible payment transaction, in response to the request, generating a one-time token, based on the actual payment information and a most recent generated encryption salt, the one-time token having the same format as the payment information, with a routing segment of the one-time token being identical to a routing segment of the payment information, and presenting the one-time token.

10 Claims, 3 Drawing Sheets

(56) References Cited

U.S. PATENT DOCUMENTS

| | | | | |
|---|---|---|---|---|
| 2008/0319905 | A1* | 12/2008 | Carlson | G06Q 40/02 705/44 |
| 2009/0202081 | A1* | 8/2009 | Hammad | H04L 9/0822 380/285 |
| 2010/0185545 | A1* | 7/2010 | Royyuru | H04L 9/16 705/67 |
| 2010/0287382 | A1* | 11/2010 | Gyorffy | G06F 21/36 713/185 |
| 2012/0203663 | A1* | 8/2012 | Sinclair | G06F 21/30 705/26.41 |
| 2013/0282590 | A1* | 10/2013 | Rajarethnam | G06Q 20/3276 705/71 |
| 2014/0188586 | A1* | 7/2014 | Carpenter | G06Q 30/0222 705/14.23 |
| 2015/0032627 | A1* | 1/2015 | Dill | G06Q 20/385 705/44 |
| 2015/0036823 | A1* | 2/2015 | Graube | H04W 12/02 380/274 |
| 2015/0317632 | A1* | 11/2015 | Park | G06Q 20/40 705/75 |

OTHER PUBLICATIONS

SearchSecurity.com (non-Patent Literature). http://searchsecurity.techtarget.com/definition/plaintext, retrieved Jan. 24, 2018.*
PCI Security Standards Council; PCI DCC Tokenization Guidelines; Aug. 2011; 23 pgs.
MasterCard® inControl™ Innovative processing platform; http://newsroom.mastercard.com/wp-content/uploads/2011/09/FINAL-InControl-sell-sheet-US.pdf; © 1994-2009; 2 pgs.
Chase Paymentech Tokenization Perspective; www.chasepaymentech.com; © 2010; 3 pgs.
TokenEx; Cloud-Based Tokenization: Toekize Data From Any Source; www.tokenex.com; © 2013; 2 pgs.
FutureX; PCI compliant mobile payment solutions for Point-to-Point Encryption (P2PE) of sensitive cardholder data; www.futurex.com; © 1981-2014; 2 pgs.
Auric Payment Vault; PCI compliant payment processor independent tokenized credit card or sensitive data storage; www.auric.com; © 1996-2014; 1 pg.

\* cited by examiner

SYSTEMS AND METHODS OF PROCESSING PAYMENT TRANSACTIONS USING ONE-TIME TOKENS

FIELD

The present disclosure relates to systems and methods for processing payment transactions through use of one-time tokens presented to merchants.

BACKGROUND

This section provides background information related to the present disclosure, which is not necessarily prior art.

When a consumer presents a payment card, or other form of account-based purchasing, payment information, for example, a primary account number (PAN), is known to be provided to a merchant and passed through various networks, including public networks, to complete the transaction. The payment information may further be stored at multiple points during the transmission. The different storage locations and/or different networks expose the payment information to different levels of security. In a circumstance where a data breach occurs, either during the transmission, or at a storage location, the payment information may be captured by a third party and used to complete fraudulent transactions. Upon discovery of the breach, payment information is commonly changed and reissued to a consumer, leaving the consumer without use of the payment card, or other form of account-based purchasing, for a period of time. Data breaches are problematic, costly, and potentially damaging to business' reputations.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

When a consumer attempts to complete a payment transaction, payment information specific to the consumer (e.g., a primary account number (PAN)), may be masked by generating a one-time token (e.g., a pseudo-PAN, etc.), which is then used during certain segments of the transaction from a consumer to a merchant, and to an issuer. In particular, in the several embodiments herein, a temporary pseudo-PAN is generated (at a consumer computing device) based on an actual PAN, and transmitted through the payment network. The pseudo-PAN is then decrypted to reveal the actual PAN. In this manner, the actual payment information is omitted from certain segments of the payment transaction. Therefore, if a data breach occurs at such segments, where the payment information specific to the consumer (e.g., the actual PAN) is masked, the data breach reveals the one-time token, and not the consumer-specific payment information, thereby reducing the potential for fraudulent transactions and/or reissue of payment information due to the data breach.

Figure 1:
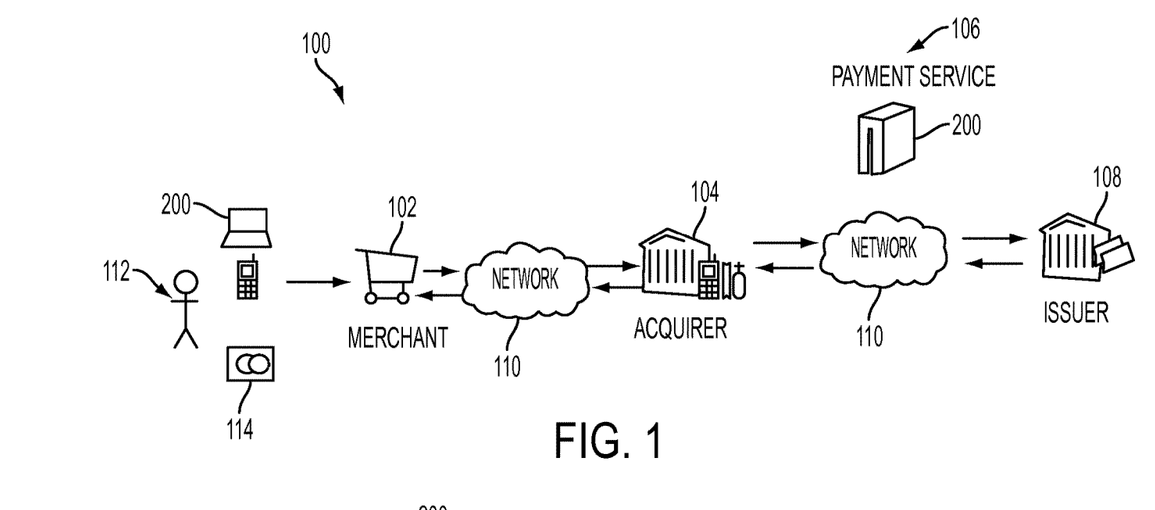
FIG. 1 is a block diagram of an exemplary system of the present disclosure suitable for use in processing of payment transactions using one or more pseudo-PANs.

FIG. 1 illustrates an exemplary system 100, in which the one or more aspects of the present disclosure may be implemented. Although, in the described embodiment, components of the system 100 are presented in one arrangement, other embodiments may include the same or different components arranged otherwise, depending, for example, on the type of payment transaction being completed.

The system 100 includes a merchant 102, an acquirer 104, a payment service 106, an issuer 108, each coupled together via one or more networks 110. Generally, to complete a transaction, the merchant 102 transmits an authorization request for a transaction to the acquirer 104, which in turn transmitted via the payment service 106 to the issuer 108. The issuer 108 then determines whether to authorize or reject the transaction, and replies to the authorization request accordingly. The reply is transmitted back through the payment service 106, and the acquirer 104, to the merchant 102. The transaction is then settled by and between the merchant 102, the acquirer 104, and the issuer 108. The particular payment information included in the authorization request, and the reply, (e.g., a PAN) is described in more detail below with reference to FIG. 3.

In the embodiment of FIG. 1, one or more of the networks 110 may include, without limitation, a local area network (LAN), a wide area network (WAN) (e.g., the Internet, etc.), a mobile network, a virtual network, and/or another suitable public and/or private network capable of supporting communication among two or more of the components illustrated in FIG. 1, or even combinations thereof. The networks 110 may include multiple different networks, used in different segments of transmission of payment information between the merchant 102 and the issuer 108. For example, a private card transaction network may be made accessible by the payment service 106, while a public network may be used between the merchant 102 and the acquirer 104.

As shown in FIG. 1, a consumer 112 is further present in system 100. The consumer 112 associates with the merchant 102 to complete a transaction, such as the purchase of a product or a service. A payment form 114 is associated with the consumer 112 to pay for the product or service. The payment form 114 may include, without limitation, magstripe cards, mobile magstripe cards, smartcards, chip cards, etc. The payment form 114 is associated with a payment account, such as a credit account, a checking account, a prepaid account, or other account, where the transaction is posted to the account and the consumer 112 makes payments to the account. The payment form 114 is provided with payment information to identify the payment account and to permit transactions, using the payment form 114, to be posted to the payment account.

Each of the merchant 102, the acquirer 104, the payment service 106, and the issuer 108 may be implemented in a computing device, which may include a single computing device or multiple computing devices located together, or distributed across a geographic region. As shown in FIG. 1, the payment service 106 is implemented in a computing device 200, which may include multiple servers, and the consumer 112 is associated with a different computing device 200, which may include, for example, a portable computing device, such as a smartphone, tablet, or laptop computer, etc. The exemplary computing device 200 is described below with reference to FIG. 2. The system 100, and the components therein, however, should not be considered to be limited to the computing device 200, as different computing devices and/or arrangements of computing devices may be used in other embodiments.

Figure 2:
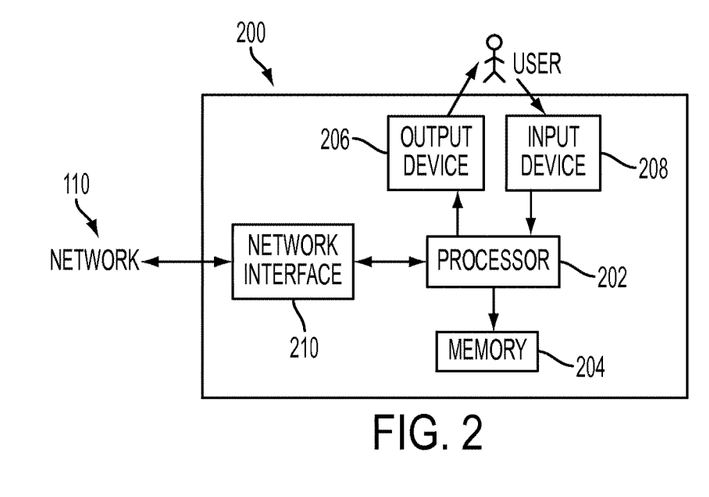
FIG. 2 is a block diagram of a computing device, that may be used in the exemplary system of FIG. 1

Referring to FIG. 2, the exemplary computing device 200 includes a memory 204 and a processor 202 that is coupled to memory 204. The processor 202 may include one or more processing units (e.g., in a multi-core configuration, etc.). The processor 202 may include, but is not limited to, a general purpose central processing unit (CPU), a microcontroller, a reduced instruction set computer (RISC) processor, an application specific integrated circuit (ASIC), a programmable logic circuit (PLC), a gate array, and/or any other circuit or processor capable of the functions or processes described herein.

Memory 204, as described herein, is one or more devices that enable information such as executable instructions and/or other data to be stored and retrieved. Memory 204 may include one or more computer-readable media, such as, without limitation, dynamic random access memory (DRAM), static random access memory (SRAM), a solid state disk, and/or a hard disk. Memory 204 may be configured to store, without limitation, payment information, tokens, pseudo-PANs, actual PANs, encryption salts, authorization request, and/or any other type of data suitable for use as described herein. Furthermore, in various embodiments, computer-executable instructions may be stored in memory 204 for execution by the processor 202 to cause the processor 202 to perform one or more of the functions described herein, such that memory 204 is a physical, tangible, and non-transitory computer-readable media. It should be appreciated that memory 204 may include a variety of different memories, each implemented in one or more of the functions or processes described herein.

In the exemplary embodiment, computing device 200 includes an output device 206 that is coupled to the processor 202. The output device 206 outputs to a user by, for example, displaying and/or otherwise outputting information such as, but not limited to, payment information, tokens, actual PANs, pseudo-PANs, and/or any other types described herein. The output device 206 may include, without limitation, a cathode ray tube (CRT), a liquid crystal display (LCD), a light-emitting diode (LED) display, an organic LED (OLED) display, and/or an "electronic ink" display. In at least one embodiment, the output device 206 includes a radio-frequency (RF) transmitter or other transmitter suitable to emit a signal indicative of an output, such as, for example, a one-time token. In some embodiments, output device 206 includes multiple devices.

The computing device 200 includes an input device 208 that receives input from the user, such as a purchaser. The input device 208 is coupled to the processor 202 and may include, for example, a keyboard, a pointing device, a mouse, a stylus, a touch sensitive panel (e.g., a touch pad or a touch screen, etc.), and/or an audio input device. Further, in various exemplary embodiments, a touch screen, such as that included in a tablet, a smartphone, or similar device, behaves as both output device 206 and input device 208.

As shown, the computing device 200 further includes a network interface 210 coupled to the processor 202. The network interface 210 may include, without limitation, a wired network adapter, a wireless network adapter, a mobile telecommunications adapter, or other device capable of communicating to one or more different networks, including the networks 110 illustrated in FIG. 1. In at least one embodiment, computing device 200 includes processor 202 and one or more network interfaces 210 incorporated into or with processor 202.

Referring again to FIG. 1, each computing device associated with the consumer 112 and the payment service 106, through execution of program instructions by the processor 202, generates encryption salts. The salt is generally a randomly generated number, and synchronized between the consumer computing device and the payment service computing device. Generally, the synchronization is from set up (and based, for example, a mutual clock source, etc.) and is not tracked or otherwise confirm as part of normal operations. The number may be generated, by the processor 202, based on a variety of different data, including, without limitation, a time, a date, a day of the week, a season, a month, a year, or any other dynamic data, etc. The salt, in other embodiments, may be generated based on static data, including, for example, certain consumer-specific data, described below. In the exemplary embodiment, the salt is generated periodically, or at a predetermined interval, yet synchronized between the consumer's computing device 200 and the payment servicer's computing device 200. Accordingly, even though generated periodically, each of the computing devices 200 generate the salt, which is consistently the same at the consumer 112 as at the payment service 106. The salt, in this embodiment, changes, for example, every 1 minute, two minutes, three minutes, five minutes, ten minutes, etc.

In this manner, in this embodiment, the payment service 106 and the consumer 112 possess a data point, which is unknown to the merchant 102, the acquirer 104, the issuer 108, and others interacting with the system 100, whether properly or fraudulently. It should be appreciated that in other embodiments, the encryption salt may be known to, for example, the issuer 108 and/or the acquirer 104, where certain processes, described below with reference to the payment service 106, may be performed by others.

Figure 3:
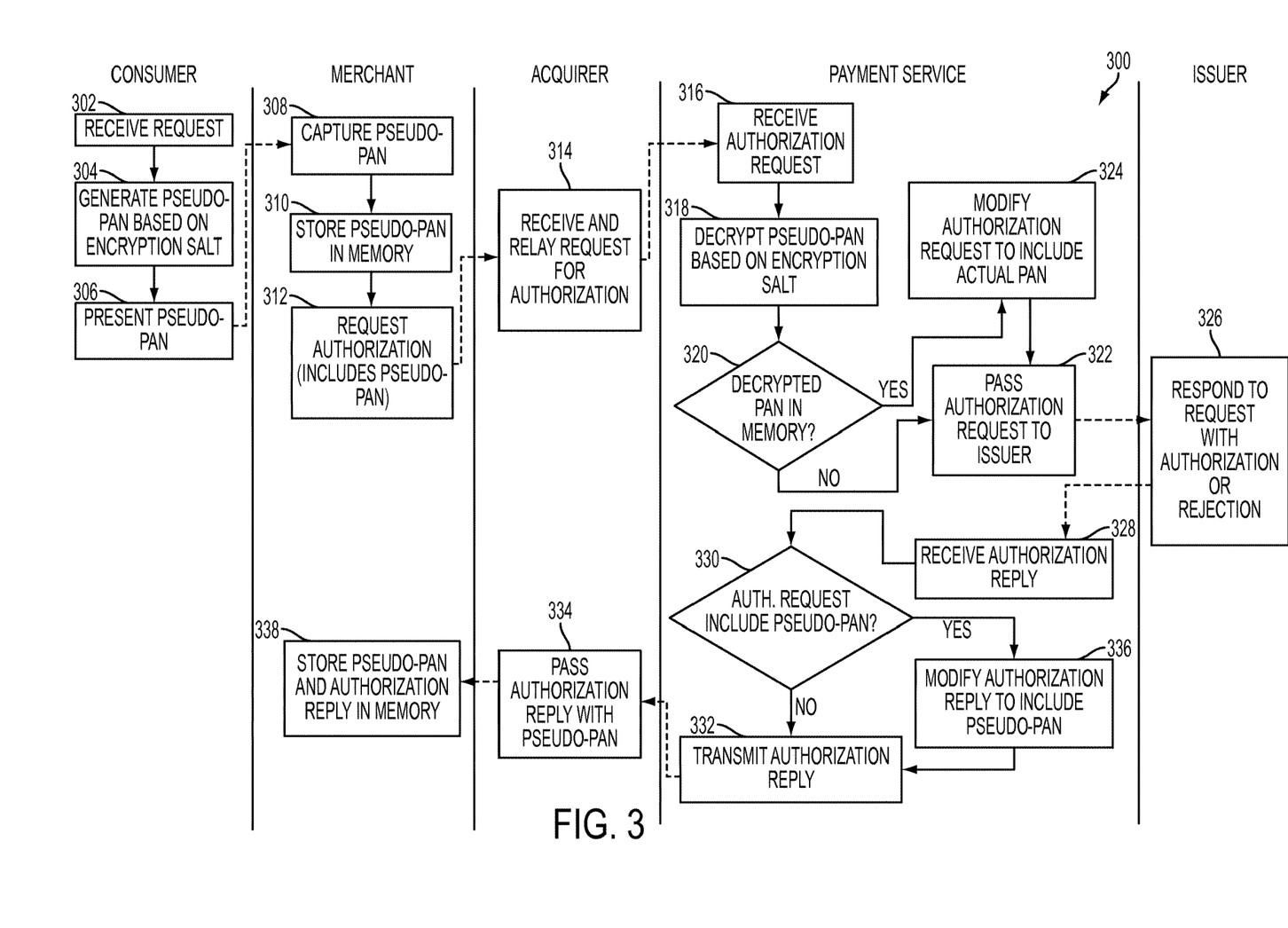
FIG. 3 is an exemplary method for processing payment transactions through use of a pseudo-PAN.

FIG. 3 illustrates an exemplary method of processing a payment transaction by a one-time token. The one-time token, in this example, is a temporary pseudo-PAN generated, as described below, and presented to the merchant 102, in lieu of an actual PAN associated with a payment account. The pseudo-PAN is processed through the system 100, as described above, to complete a transaction. It should be understood when a payment form 114 is presented to the merchant 102, a variety of information is provided to the merchant 102, who in turn provides an authorization request to the payment network (e.g., 0100 or 0200 messages consistent with the ISO 8583 standard, etc.). The methods described herein may further be employed to encrypt any different data, included in the authorization request, and in particular, authentication data, such as a CVV (card verification value) code, etc., with or separate from the actual PAN. Where the method includes generating a one-time token for payment information, it should be understood that all or only a portion of the payment information may be the basis for the generated one-time token. For purposes of the description only, however, method 300 is generally described with reference to the actual PAN. Further, the method 300 is described with reference to FIGS. 1-2, but should not be understood to be limited to the particular systems or computing devices. Likewise, the systems and computing device shown in FIGS. 1-2 should not be understood to be limited to the exemplary method 300.

Referring to FIG. 3, in anticipation of making a purchase, the consumer 112 provides a request to the computing device 200, and specifically, at input device 208 (e.g., a touchscreen). In turn, the computing device 200 receives the request at 302 and retrieves the actual PAN from memory 204. The actual PAN (and/or other payment information) is associated with a payment account to which the consumer 112 has elected to charge or post the anticipated transaction. In another example, the consumer 112 enters the actual PAN (and/or other payment information) into the computing device 200, along with the request. The consumer 112 may enter the actual PAN by providing the actual PAN to a keypad input device 208, by referring to a payment form 114 associated with the actual PAN (e.g., a credit card, debit card, prepaid card, EMV card, etc.), or may scan or swipe the payment card at an input device 208 (e.g., a card reader) of computing device 200.

With the payment information, including the actual PAN, the computing device 200 generates a temporary pseudo-PAN at least based on the encryption salt at 304. The pseudo-PAN, in this embodiment, is an example of a one-time token. In particular, the consumer's computing device 200 uses the most recently generated encryption salt, when generating a one-time token, and in this embodiment, stores the one-time token (and the salt) in memory 204. Because the salt is generated periodically, and the one-time token is based on the salt, the one-time token is valid, after generation, for a period of time until a subsequent salt is generated. Accordingly, the one-time token may be used to initiate transactions only while valid (often, only one transaction).

In this exemplary embodiment, the computing device 200, in generating the pseudo-PAN, preserves the format of the actual PAN, i.e., format preserving encryption (FPE). In particular, where the actual PAN is X digits (X being an integer value), in this exemplary embodiment, the computing device 200 generates a pseudo-PAN, which is also X digits. In one example, the actual PAN and the pseudo-PAN are both 16 digits (e.g., alpha and/or numeric digits). It should be appreciated that a different number of digits, and/or various types of digitals, may be employed in other embodiments. In one particular example, generating the pseudo-PAN, while preserving the format, includes a traditional Feistel network approach for normal block ciphers. The Feistel network is applied to the actual PAN in a particular manner to preserve the format of the actual PAN (and/or other payment information) being encrypted. In this example, the actual PAN to be encoded is split into lhs (left hand side) and rhs (right hand side) components that is then processed through a Feistel network technique, in combination with the salt. The number of Feistel network passes and function to perform the encryption on each pass may be altered, in different embodiments, to achieve one or more desired encryption qualities. Other techniques to generate a one-time token are known in the industry, such as, for example, CAST-128, DES, Triple DES, RC5, or RC6 techniques, etc. Any such techniques, or similar techniques, known to preserve the format of the data to be encrypted may be employed in various embodiments of the present disclosure.

Further, in this exemplary embodiment, the computing device 200 (associated with the consumer 112) preserves at least a portion of the actual PAN (and/or other payment information), when generating the one-time token, such that at least a portion of the pseudo-PAN is the same as the actual PAN. For example, a first Y digits of the actual PAN may be preserved, whereby the first Y digits of the pseudo-PAN are the same. In the example shown in FIG. 4, an actual PAN includes 16 digits ("5555 6666 7777 8888"). The actual PAN includes a routing segment 402, an account number segment 404, and a checksum digit segment 406. The routing segment 402 is an issuer identification number (IIN), which is used in transmitting an authorization request through the system 100, to ensure the authorization request is sent to the appropriate payment service 106 and issuer 108. The first digit of which is a major industry identifier. The PAN further includes an account number segment 404, which is unique to the consumer 112, and a checksum digit segment 406, which is used as a check for a valid PAN. The value of the checksum digit segment 406 varies based on the other 15 numbers so that an industry specific MOD 10 check can be performed to insure the PAN is a valid card. The MOD 10 check is a simple mathematical algorithm; when the pseudo-PAN is generated, in this example, the check digit will be set such that the full 16-digit number will pass the MOD 10 check.

Figure 4:
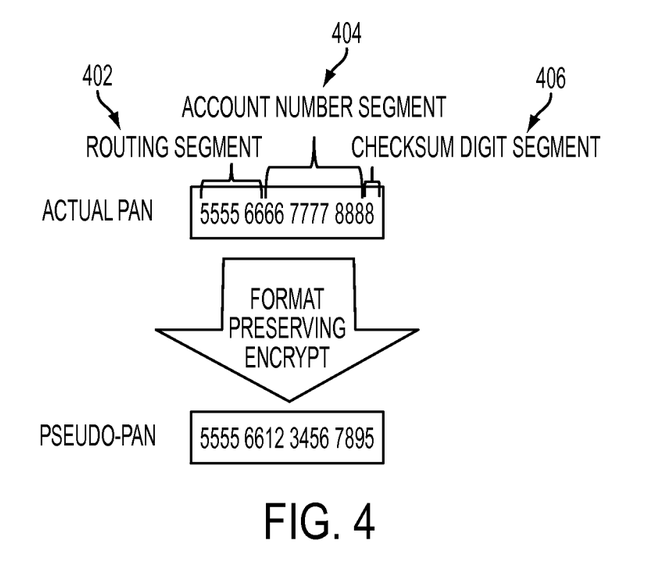
FIG. 4 is a diagram illustrating generation of a pseudo-PAN from an actual PAN.

When the pseudo-PAN is generated (as depicted in the example of FIG. 4), the first six digits of the PAN, or the routing segment 402 (or Bank Identification Number (BIN)) in this example, are preserved in the pseudo-PAN (" 555566 12 3456 7895), while the remainder of the pseudo-PAN is encrypted. And, the payment service 106 further includes a proper checksum digit segment 406, which is selected based on the routing segment 402 and the encrypted account number segment, so that the pseudo-PAN satisfies the MOD 10 check described above. In this manner, the routing segment 402 is preserved, and the pseudo-PAN passes the checksum test, so that the pseudo-PAN is routed in the same manner than the actual PAN would have been routed. It should be appreciated that, in some embodiments, any portion less than the whole of the actual payment information (e.g., the actual PAN) may be preserved in the one-time token (e.g., the pseudo-PAN) or not, depending on, for example, the routing of the transaction by one or more of the entities illustrated in FIG. 1.

After the pseudo-PAN is generated, the consumer's computing device 200 presents the pseudo-PAN at 306, to the consumer 112, to the merchant 102, or to another entity associated with the transaction. In one example, the computing device 200 displays the pseudo-PAN at an output device 206, such that the consumer 112 may simply present or speak the pseudo-PAN to the merchant 102. In a different example, the consumer's computing device 200 may display a symbol representative of the pseudo-PAN, such as a barcode, QR code, etc. In such an example, an input device 208 associated with the merchant's computing device 200 may scan the symbol, to thereby receive the pseudo-PAN. In yet another example, the consumer's computing device 200 may emit a radio frequency signal indicative of the pseudo-PAN (e.g., near field communication (NFC), radio frequency identification (RFID), etc.), such that an input device 208 associated with the merchant's computing device 200 may read or receive the signal, and as a result, receive the pseudo-PAN.

As shown in FIG. 3, the merchant 102 captures the pseudo-PAN at 308 and stores the pseudo-PAN in memory at 310. The merchant 102 then transmits an authorization request at 312 (e.g., 0100 or 0200 message, etc.) for the transaction, including the pseudo-PAN, to the acquirer 104. The acquirer 104, in turn, relays the authorization request at 314 to the payment service 106.

Upon receipt of the authorization request, the payment service 106 decrypts the pseudo-PAN (and in some instances the actual PAN) contained therein at 318, by use of the same encryption algorithm used by the consumer's computing device 200 and the most recently generated salt (which is synchronized with or the same as the consumer's salt). The payment service 106 then searches in memory at 320, in the computing device 200, for the decrypted PAN. It should be appreciated that, in this embodiment, if the authorization request does not include a pseudo-PAN, a match will not be found in memory, and the payment service 106 will pass this authorization request to the issuer 108, without modification at 322.

Conversely, if the decrypted PAN is found in memory, the payment service 106 modifies the authorization request to include the actual PAN (i.e., the decrypted PAN) at 324, and then passes the modified authorization request to the issuer 108 at 322. It should be appreciated that when payment information different than the PAN (e.g., the CVV code), or in addition to the PAN, is encrypted at the consumer's computing device 200, the payment service 106 will further modify the authorization request to include the decrypted payment information, prior to passing the authorization request to the issuer 108.

In at least one embodiment, depending on, for example, the frequency at which encryption salts are generated, the payment service 106 may attempt to decrypt the pseudo-PAN, using the next to last encryption salt, i.e., the synchronization salt generated just prior to the most recently generated encryption salt. In this embodiment, the payment service 106 permits rapid generation of encryption salts, but limits the chance that a pseudo-PAN would be rejected. More specifically, by checking not only the most recently generated sale and the next to last salt, the payment service will substantially reduce the rejection of a payment transaction because the encryption sale changed between the time the consumer 112 requests the pseudo-PAN, and the time the authorization request reaches the payment service 106. It should be apparent that this interval may be 30 seconds, 2 minutes, 5 minutes or longer, which may result in pseudo-PAN being rejected where, for example, encryption salts are generated everything three minutes, etc. The payment service 106 may account for such delay (between the consumer 112 and the payment service 106) and reduce the number of false authorization denials, by further decrypting the pseudo-PAN based on the next to last encryption salt, when the most recently generated encryption salt does not permit decrypting the pseudo-PAN to an actual PAN.

Referring again to FIG. 3, in response to the authorization request, the issuer 108 responds to the request at 326, and in turn, the payment service 106 receives the reply to the authorization request (including the actual PAN) at 328. When the authorization request includes an actual PAN at 330, the payment service 106 transmits the issuer's reply to the acquirer 104 at 332, who in turn passes the authorization reply at 334 to the merchant 102. Conversely, when the authorization request includes a pseudo-PAN at 330, the payment service 106 modifies the authorization reply from the issuer 108 at 336 to include the pseudo-PAN, rather than the actual PAN it had provided to the issuer 108. The payment service 106 then transmits the modified authorization reply at 332 to the acquirer 104, who in turn passes the authorization reply at 334 to the merchant 102. The merchant 102 stores at 338 the pseudo-PAN and authorization number from the issuer 108 in memory, i.e., its database of transactions. At this point, the transaction is complete.

It should be appreciated that in this manner, the consumer-specific payment information (e.g., the actual PAN) is not used in certain segments of the payment transaction and is thus not vulnerable to a data breach in those parts of the payment transactions. For example, where there is a data breach at the merchant, the database of transactions including the one-time tokens, such as pseudo-PANs, may be obtained by third parties, but because the tokens are only valid until the next generated encryption salt, the tokens are effectively useless to the third parties. And, the actual payment information (e.g., the actual PAN) is not provided to the merchant 102, and therefore not known to the merchant 102. As such, the third party, who breached the merchant 102, would not be able to access the payment information. Moreover, it should further be understood that, because the format and routing segment of the actual PAN is preserved in the exemplary embodiment, method 300 may be implemented in an existing payment network, without the changes or alterations to how the merchant 102, the acquirer 104, and the issuer 108 handle transactions.

In various embodiments, where the one-time token is based on a consumer-specific salt, the consumer 112 is registered to the payment service 106, or associated acquirer 104 or issuer 108. Registration of the consumer 112 includes storing, at the payment service 106, consumer-specific data, such as, for example, a personal identification number (PIN) or biometric identifier (e.g., a fingerprint, etc.). In one example, where the consumer 112 accesses his/her payment account at a website associated with its issuer, the consumer 112 and the payment service 106 communicate through the issuers' website, for example, through Open API (application programming interface), etc., which is often not apparent to the consumer 112. Through the communication, the consumer 112 is registered to the payment service 106, whereby the appropriate consumer-specific data is received and stored by the payment service 106. Through registration, the payment service 106, and the consumer 112, each have consumer-specific data, which may be used in combination with the encryption salt (described above), for example, to generate one-time tokens. When the payment service 106 receives a one-time token based on consumer-specific data, the payment service 106 receives an indication of not only a one-time token, but also an identification of the consumer 112, so that the payment service 106 may decrypt the one-time token based on their consumer-specific data and the salt, as described above. The consumer identification may be included in one or more fields in an ISO message, possibly the authorization request described above. The addition of such consumer-specific data may, in some embodiments, provide a further encryption of the payment information included in the authorization request and passed through the payment network.

It should be appreciated that the functions described herein, in some embodiments, may be described in computer executable instructions stored on a computer readable media, and executable by one or more processors. The computer readable media is a non-transitory computer readable media. By way of example, and not limitation, such computer-readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following steps: (a) generating an encryption salt, (b) receiving, at an input device, a request from a consumer indicating an eminent payment transaction, (c) in response to the request, generating, at a processor, a pseudo-PAN based on the actual PAN and a most recently generated encryption salt, the pseudo-PAN having the same format as the actual PAN, with a first Y digits of the pseudo-PAN being identical to a first Y digits of the actual PAN, and (d) presenting the pseudo-PAN.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for use in processing authorization requests for payment transactions from merchants, the system comprising:
a computing device configured to communicate with a payment network, the computing device including a processor and a memory coupled to the processor, the memory including a plurality of actual PANs and executable instructions, which when executed by the processor, cause the processor to perform the steps of:
periodically generating an encryption salt;
receiving a first authorization request for a payment transaction to a payment account, the first authorization request including a first PAN, wherein the first PAN is a pseudo-PAN generated based on an encryption algorithm by a computing device associated with a cardholder of the payment account, the pseudo-PAN having the same format as each of the plurality of actual PANs stored in the memory;
decrypting the first PAN based on the encryption algorithm and the encryption salt most recently generated prior to receipt of the first authorization request;
searching, in the memory, for one of the plurality of actual PANs that matches the decrypted first PAN;
determining the decrypted first PAN matches one of the plurality of actual PANs in the memory, thereby indicating that the first PAN included in the received first authorization request is the pseudo-PAN;
modifying the first authorization request to include said one of the plurality of actual PANs in place of the first PAN, in response to the determination of the decrypted PAN matching said one of the plurality of actual PANs in the memory;
transmitting the modified first authorization request to an issuer;
receiving a second authorization request, the second authorization request including a second PAN;
decrypting the second PAN based on the encryption algorithm and the encryption salt most recently generated prior to receipt of the second authorization request;
determining the decrypted second PAN does not match any of the plurality of actual PANs in the memory; and
transmit the second authorization request to the issuer without modification, in response to the determination of the decrypted second PAN not matching any of the plurality of actual PANs in the memory.

2. The system of claim 1, wherein the executable instructions, when executed by the processor, further cause the processor to perform the step of: receiving an authorization reply from the issuer in response to the first authorization request, modifying the authorization reply to include the pseudo-PAN in place of the actual PAN, and transmitting the modified authorization reply back to a merchant associated with the first authorization request.

3. The system of claim 1, wherein the executable instructions, when executed by the processor, cause the processor to perform the step of periodically generating encryption salt at Z-minute intervals, and wherein Z is a number greater than 0.

4. The system of claim 1, wherein a first Y digits of the first PAN included in the first authorization request are identical to the first Y digits of the corresponding actual PAN; and
wherein the executable instructions, when executed by the processor, cause the processor to perform the step of decrypting a segment of the first PAN included in the first authorization request, other than the Y digits, in order to decrypt the first PAN.

5. A system for use in processing an authorization request for a payment transaction from a merchant, the system comprising:
a computing device coupled to a payment network, the computing device including a processor and a memory coupled to the processor, the memory including actual payment information for multiple payment accounts and executable instructions, which when executed by the processor, cause the processor to perform the steps of:

periodically generating an encryption salt;

receiving an authorization request for a payment transaction associated with a cardholder and directed to one of the multiple payment accounts in the memory, the authorization request including a one-time token generated by a computing device associated with the cardholder based on a cardholder encryption salt, the encryption salt generated by the processor synchronized to the cardholder encryption salt, and the one-time token having the same format as the actual payment information for each of the multiple payment accounts in the memory;

decrypting the one-time token based on the most recently generated encryption salt prior to receipt of the authorization request;

searching, in the memory, for the decrypted one-time token;

determining whether the decrypted one-time token matches the actual payment information for any of the multiple payment accounts in the memory;

in response to determining that the decrypted one-time token matches said actual payment information for the one of the multiple payment accounts in the memory:

modifying the authorization request to include the actual payment information for the one of the multiple payment accounts in place of the one-time token; and transmitting the modified authorization request to an issuer; and in response to determining that the decrypted one-time token does not match said actual payment information for any of the multiple payment accounts in the memory, transmit the unmodified authorization request to the issuer.

6. The system of claim 5, wherein the one-time token is a pseudo-PAN and said actual payment information includes an actual PAN for each of the multiple payment accounts.

7. The system of claim 6, wherein the executable instructions, when executed by the processor, cause the processor to perform the step of generating the encryption salt in sync with the cardholder encryption salt based on a mutual clock source.

8. The system of claim 1, wherein the encryption salt is a random number generated based on dynamic data associated with the computing device.

9. The system of claim 4, wherein the first Y digits of the first PAN included in the first authorization request consist of six digits and wherein the first Y digits of the corresponding actual PAN consist of six digits.

10. The system of claim 5, wherein the encryption salt is a random number generated based on dynamic data associated with the computing device.

* * * * *